July 20, 1937.  J. FEIDERT  2,087,536
MEANS FOR COUPLING GARBAGE PAILS WITH THE TILTING FRAMES OF GARBAGE CARTS
Filed June 28, 1934  3 Sheets-Sheet 2
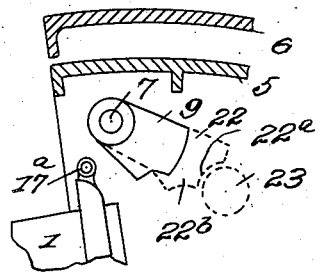
Fig. 4.
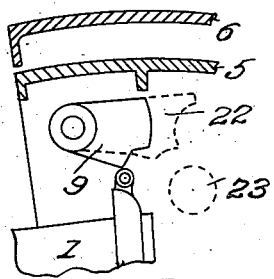
Fig. 5.
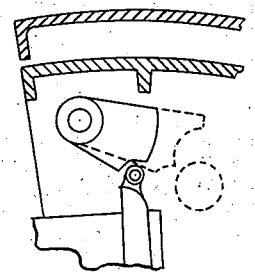
Fig. 6.
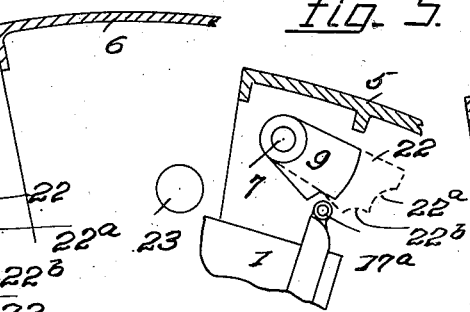
Fig. 7.
Fig. 8.
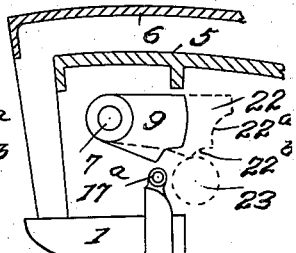
Fig. 9.
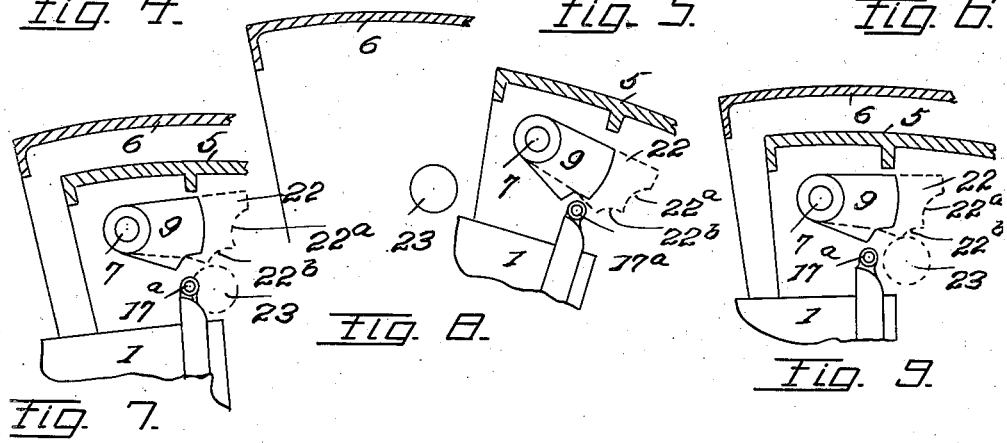
Fig. 15.
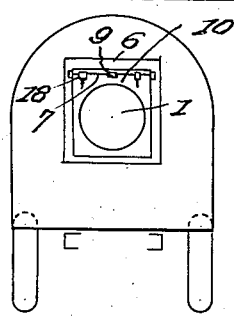
Fig. 16.
Inventor
Joseph Feidert
By
Attorney July 20, 1937.  J. FEIDERT  2,087,536
MEANS FOR COUPLING GARBAGE PAILS WITH THE TILTING FRAMES OF GARBAGE CARTS
Filed June 28, 1934  3 Sheets-Sheet 3
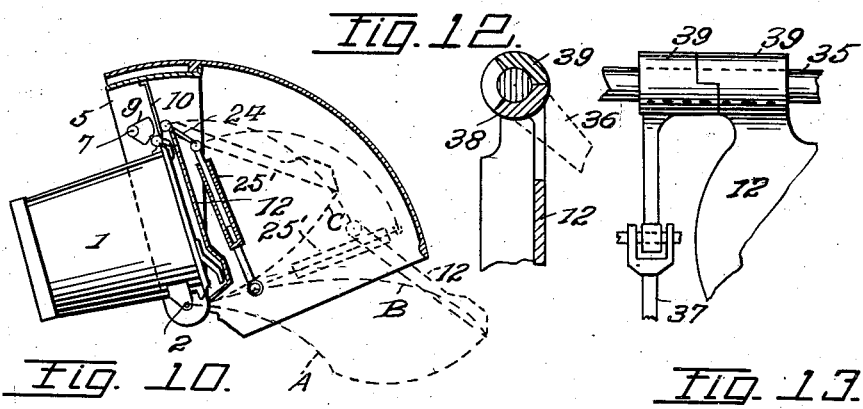
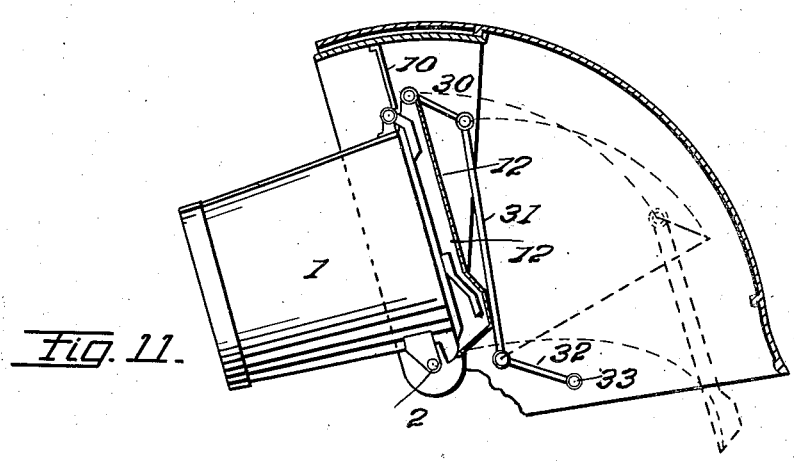
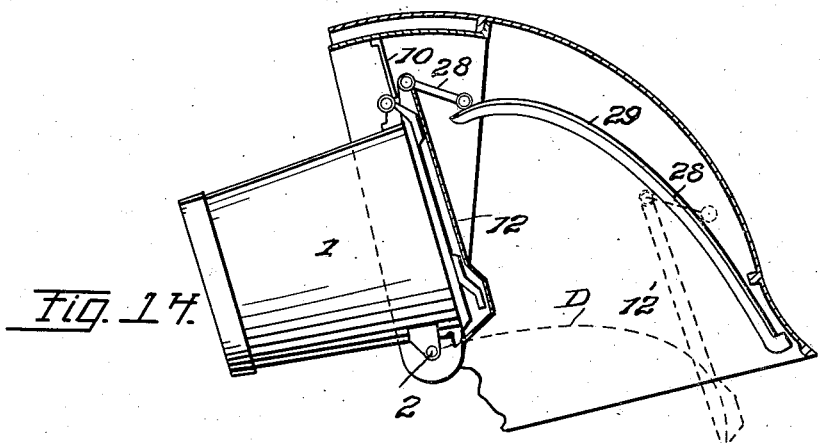
Inventor
Joseph Feidert
By
Attorney Patented July 20, 1937

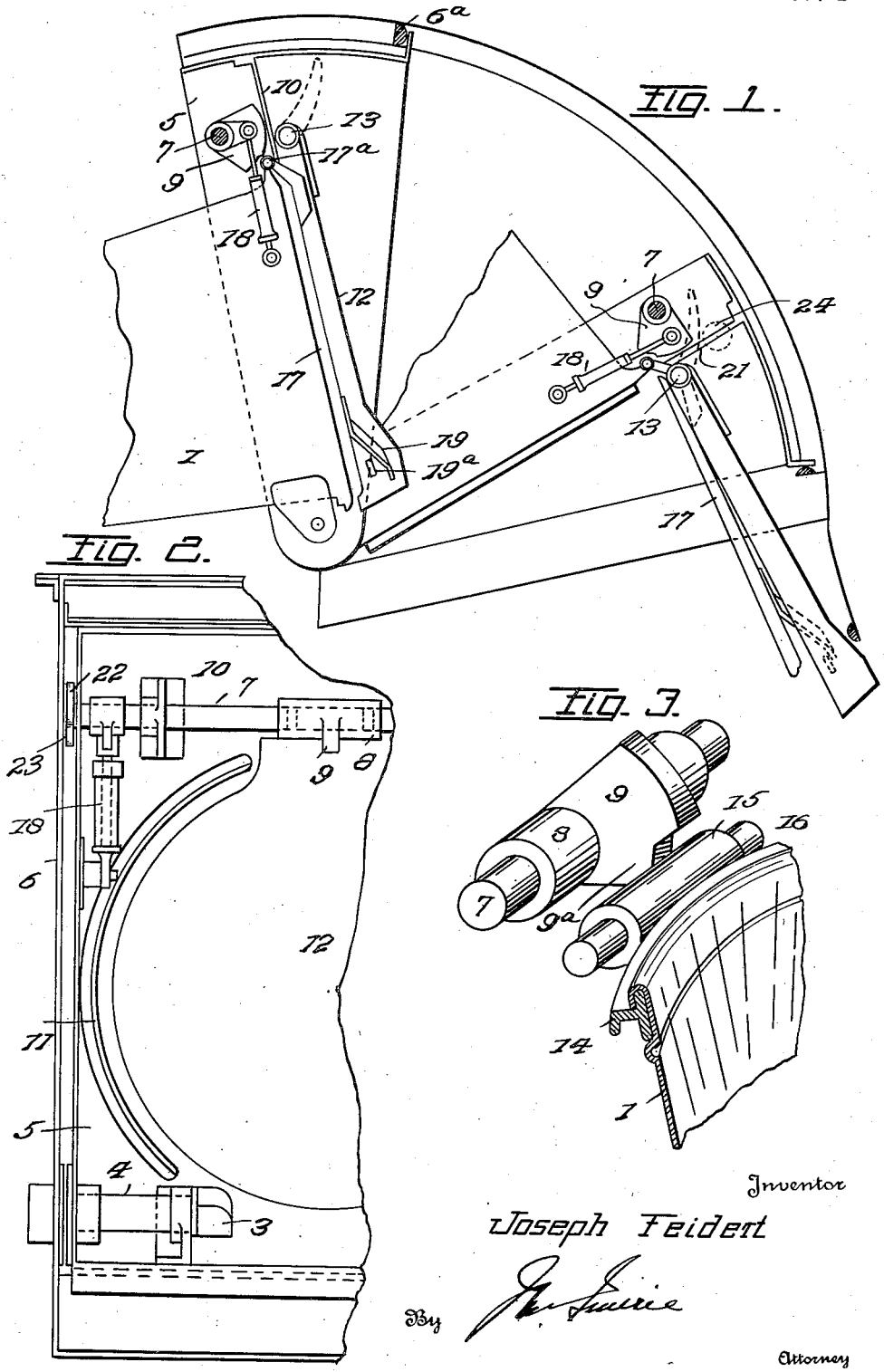

2,087,536

UNITED STATES PATENT OFFICE 2,087,536

MEANS FOR COUPLING GARBAGE PAILS WITH THE TILTING FRAMES OF GARBAGE CARTS

Joseph Feidert, Luxemburg, Luxemburg

Application June 28, 1934, Serial No. 732,948
In Belgium June 30, 1933

12 Claims. (Cl. 220—98)

A large number of different systems are known for engaging garbage pails with tilting means for emptying them into a garbage cart. The tilting motion is usually effected by means of a pivoted frame, to which the pail is suitably attached. Recent improvements in connection with such devices have aimed at fulfilling the following two conditions: a sealed closure, so far as possible, between the sides of the garbage discharge opening, and a solid coupling of the pail in order to avoid any deformation of members subjected to tension stresses. The solution of this latter problem constitutes the chief object of my present invention.

In the first types of couplings, the lid of the pail was engaged by the tilting frame. In order to return the frame to its initial position after the pail was emptied, a pull was exerted on the pail attached to said frame. This rapidly led to deformations of the lid. In other embodiments of more recent construction, the coupling is ensured by engaging the hinge bolt, which however is a rather delicate member and gives way under the stresses. A third type of coupling was then carried out in which a stronger part of the pail, i. e. its side wall, was engaged. However in this case it was necessary to provide the tilting frame with a relatively long engaging member in order to reach the corresponding projecting member of the pail and this necessarily gave rise to disadvantages in the operation of the device. Lastly the two coupling members were made either as two elements respectively rigidly secured to the frame and to the pail, or as a pivoted hook or claw mounted on the frame and adapted to engage an eye fixed to the frame, or again they may be constituted by a lock bolt adapted to slide in the plane of the frame wall and to reach behind an inturned ledge of the pail.

The solution provided by my present invention is entirely different. Whereas I make use of a coupling close to the hinge of the pail, I do so under entirely new conditions whereby the aforesaid disadvantages are eliminated.

In the earlier systems, the hinge was fixed to the wall of the pail by lateral supporting members. This usual construction could not withstand the repeated stresses and became deformed, thereby hindering the engagement of the coupling element.

According to the present invention the upper edge of the pail is provided with a strengthening ring which may be formed of an inverted U-section. The hinge bolt is mounted in a thick walled protecting socket welded along its entire length to the said strengthening ring. The hinge bolt has projecting ends extending beyond both sides of the said socket and receives two attachment lugs mounted on the lid of the pail. The socket which forms a protecting support for the hinge and is fixed to a member (i. e. the ring) which is of greater strength than the wall of the pail itself, can easily withstand the most violent tearing stresses because such stresses are directly transmitted to the strengthened edge of the pail without acting on the hinger bolt. The coupling itself is effected by means of a cam or projecting segment secured on a horizontal shaft mounted on the frame, said cam or segment being automatically retracted behind the hinge socket by the action of springs when the pail is applied against the wall of the tilting frame.

Such a method of coupling, by means of a cam acting in the manner of a lock-bolt, which is not in a plane parallel to the wall of the swinging frame but is on the contrary in a plane at right angles thereto, and thus is not subjected to lateral stresses, affords the possibility of engagement by means of a particularly short swinging arm supported on an extremely strong shaft placed outside the wall of the tilting frame. It follows that the present system is as solid and as simple as possible and has no delicate or deformable elements.

The coupling and uncoupling operations are performed automatically by means of a system of levers which are mounted on the horizontal shaft and co-operate with abutments. The said levers lock the tilting frame in its inoperative position, the unlocking also being effected automatically.

Further, all the operations may be performed without hindrance, even if a piece gets wedged between the lid and the ledge of the pail, owing to the system of coupling employed and because of the free suspension of the lid which closes the discharge opening of the tilting frame.

The accompanying drawings illustrate, merely by way of example, and without any limitation of the invention thereto, several embodiments of the device according to my new principle of construction.

Fig. 1 is a diagrammatical, partly sectional side elevation of the garbage pail and tilting frame and of the coupling means.

Fig. 2 is a front view of the tilting frame.

Fig. 3 diagrammatically illustrates the coupling elements.

Figs. 4 to 9 are diagrams showing the relative positions of the coupling members during the different stages of the tipping operations.

Figs. 10 to 14 diagrammatically show modified forms of the device.

Figure 15 is a diagrammatic view showing a vehicle with the improved apparatus applied thereto, the mechanism being shown in delivery position in dotted lines.

Figure 16 is an end view of the same.

The garbage pail 1 is provided with two trunnions 2 (Fig. 1) engageable in the supporting bearings 3 (Fig. 2) which extend beyond the pivots 4 for the swinging frame 5 which is mounted in a casing or hopper 6 and movable by the stops 6a. A transverse horizontal shaft 7 rotatable in both directions is mounted in the upper portion of the frame. A sleeve 8 mounted in the middle of said shaft carries a cam or segment 9 extending at right angles to the axis of the shaft and turned towards the transverse wall 10 of the frame. In this wall 10 is provided the garbage discharge opening which is surrounded on both sides with a guiding flange 11 (Fig. 2) and is adapted to be closed by the flap door 12 freely suspended on the hinge 13.

The upper edge of the garbage pail 1 is provided with a strengthening ring 14 (Fig. 3), to which is welded the socket 15 forming a bearing for the hinge bolt 16 of the lid 17 of the pail, the hinge joint thus provided being designated at 17a (Fig. 1).

After being engaged at 2, the garbage pail is swung so that the seat of its lid bears against the edge of the frame's discharge opening. In this position the pail is coupled to the tilting frame by means of the attachment device which forms the subject matter of the present invention.

During the first tilting motion for applying the pail against the frame, the pail's hinge joint 17a passes under the horizontal shaft 7 and under cam 9 (Fig. 1). The said cam, in its inoperative position, being arranged in the path of the hinge joint 17a, the latter strikes the cam, raises it and slides thereunder. As soon as the cam is disengaged the lateral return springs 18 which had been tensioned, restore the cam to its initial position in such manner that said cam engages the joint 17a and coacting with the bearings 3 retains the pail in position in the tilting frame.

The second stage which constitutes the actual discharging operation is carried out by tilting the frame 5 about its pivots 4 (Figs. 1 and 2). Under the action of gravity the freely hinged lid 12 of the frame remains vertical and it consequently moves away from the garbage discharge opening and carries with it the pail's lid 17, by means of a member 19a engaging a finger 19 carried by the lid 17. In order to widen the opening of the lid during the fall of refuse an arm 20, mounted on the axis of the hinge 13, strikes an abutment 21 at the end of swinging motion.

At the end of the discharging operation, the frame 5 is returned to its former position by pulling the pail coupled to the frame. As soon as the frame reaches its initial position the pail must automatically be uncoupled. For this purpose, an inclined arm 22 is mounted at each end of the horizontal shaft 7 and strikes against an abutment 23 secured to the lateral wall of the casing 6. The weight of the swinging frame lifts the arm 22 and rotates the shaft 7 carrying said arm, thereby raising the locking cam 9. Thus the hinge joint 17a is no longer held (Fig. 3) and the pail is uncoupled and swings back on its trunnions 2 (Fig. 1).

The frame, restored to its initial position, is locked therein by the surfaces 22a of the arms 22 which engage the abutments 23 as shown in Fig. 4. Swinging of the frame, out of its inoperative position, thus is prevented when, for instance, the frame's flap door is lifted by hand in order to introduce refuse into the hopper, an operation which cannot be carried out in several systems of garbage discharge but which can be achieved with the system according to my present invention because the hinge 17a of the lid 12 is free in its bearings.

Figs. 4 to 9 illustrate diagrammatically the coupling means for the pail and the locking of the frame.

Fig. 4 shows the device with its frame in inoperative position. 7 is the horizontal shaft which is mounted on the frame and carries centrally the cam 9 which has a projection 9a engageable with the hinge 17a. In the position shown in Fig. 4, the shaft 7 mounted on the frame cannot move in the direction of the arrow. The frame thus is locked until the pail is coupled thereto.

Fig. 5 illustrates the pail's hinge socket 17a in the act of lifting the cam 9 as well as the arms 22 mounted on the shaft 7. Fig. 6 shows the pail coupled to the frame, the hinge 17a being held by cam 9 which falls back behind the hinge. In this angular position of the cam the surface 22a of the arms 22 is higher than the axis of abutment 23. Coupling being effected, the frame is tilted in order to discharge the garbage from the pail. Shaft 7 is moved in the direction of the arrow shown in Fig. 7. The cam 22b of arm 22 slides over the abutment 23, but the hinge is not freed by the cam.

The garbage having been discharged, the frame is returned by pulling the pail coupled therewith. Slightly before reaching the initial position, the projecting lower cam 22b of the arm 22 strikes against the abutments 23 (Fig. 9). Said cam lifts the finger sufficiently to enable the cam 9 to disengage the pail's hinge. The pail then falls and the arm 22 is locked against abutment 23 (Fig. 4).

The position of the cam 9 and of the arms 22 on Fig. 5 shows that if, when discharging, the effort applied to the pail in order to slide the hinge under cam 9a should be greater than the effort required to displace the tilting frame out of its initial inclined position, the said hinge socket instead of sliding under the inclined surface of cam 9a could push said cam forward. As the arms 22 then would be lifted sufficiently to slide over the stationary abutments 23, the frame could be tilted beyond its vertical position and it could fall towards the inside of the hopper under its own weight, without having the pail coupled thereto, so that the return motion of the pail after the discharge of the garbage, would not lift the frame back into its initial position. In order to avoid this, the inclination of the lower face of cam 9a under which the pail's hinge socket slides, and the tension of the springs 18 controlling the cam and the arms on shaft 7, are both adjusted in such manner that the effort which must be exerted on the pail in order to couple it with the frame is always smaller than the effort required to move the free tilting frame out of its inclined initial inoperative position in which said frame is held by its own weight.

Another feature of my invention consists in the provision of novel means for opening, in a more advantageous manner, the door of the hopper with the lid of the pail moved in conjunction therewith.

In the embodiment of the device described hereabove and illustrated in Figs. 1 to 9, the tilting frame is locked in its inoperative position and is coupled with the pail independently of the means for opening the hopper door, so that said door may be opened freely in order directly to introduce refuse into the hopper without using a pail and without the thrust on the flap door being liable accidentally to tilt the frame towards the inside of the hopper.

However, owing to the free hinge suspension of the flap door, the tilting motion of the frame and pail obliges the lowest points of the lid and of the flap door to follow a path situated in the diametral plane common to the pail and to the flap door and perpendicular to the axes of the hinges, said path forming a curve having its convexity turned towards said hinges and having a tangent at its point of origin forming an angle of approximately 120° with the intersection of the flap door's plane with the diametral plane, because said lid and flap door remain suspended vertically until nearly the end of the tilting motion. Towards the end only of the tilting motion a finger 20 (Fig. 1) on the pivot of the flap door strikes against abutment 21 in order to cause a sudden rise of the flap door and lid.

While I thus obtain a final opening which is sufficient, and does not hinder the discharge of garbage from the pail, the path followed by the lowest point of the lid during the gradual opening is too sharply curved towards the garbage heap in the hopper so that the lid is liable either to catch in the top of the rubbish heap in the hopper and consequently it may not open sufficiently to allow a complete discharge of the contents of the pail, or else even if the pail has been emptied, the lid may, during the lifting of the pail and frame, butt into the top of the heap which has been heightened by the fall of the pail's contents, and thus carry a portion of the refuse back into the pail.

In order to avoid this inconvenience, a new device ensures that the lowest point of the lid follows, during the swinging of the frame, a path whereof the tangent at the point of origin is almost perpendicular to the plane of the flap door, whilst keeping the possibility of opening the flap door, in order to introduce refuse, without using a pail and without having to tilt the frame, so that the latter may consequently remain locked. The improved device therefore provides an increase of the available filling height of a given hopper or vehicle, or else it allows the construction of a hopper of smaller depth for the same capacity, thereby leading to a reduction of the loading height of the vehicle.

Fig. 10 illustrates such a device. A lever 24 mounted on the axis of the flap door is pivoted to a special connecting rod formed of two parts 25 and 26 which may slide on each other so that the rod can be lengthened but not shortened, the other end of said rod being pivoted to a fixed trunnion 27 mounted on the inner side of the lateral wall of the casing or hopper 6. The said rod thus is located in the space comprised between the lateral sides of the hopper 6 and of the frame 5.

When the pail and the coupled frame are tilted towards the inside of the hopper, the frame door which also moves the pail's lid, is gradually raised by the rod 25—26 which pushes the lever 24, and the door's lowest point thus is constrained to follow the path shown by curve B. It will be seen that the heap discharged then may be higher than if the lowest point of the door were freely suspended as previously described, and followed the path illustrated by curve A.

The position 25', 26' shown in dotted lines is the position taken up by the rod 25, 26 when the frame is opened manually without being tilted the two-part rod lengthening to accommodate this movement. The lowermost point of the door then follows the circular arc C.

There are known devices in which the opening of the flap door is controlled by a pivoted rod, but such rods are of invariable length, without sliding portions, and consequently they give rise to the following disadvantages:

The means for opening the flap door are integral with the tilting mechanism for the frame, so that when the door is opened without a pail for the purpose of introducing an object, the frame is tilted, falls toward the inside of the hopper and can only be lifted by hand with some difficulty.

If after the pail is emptied, some object remains wedged between the pail's lid and its seat, the flap door cannot be completely closed and the frame consequently cannot return to its initial position to which it must be restored in order to uncouple the pail. In such cases the operator's attempt to disengage the pail by exerting excessive stresses thereon whereby the projecting portion of the pail and the coupling element of the frame may be strained and deformed as well as their attachments which may even be completely torn away, especially when they are directly attached to the thin iron sheet forming the pail itself.

When a pail is too full, its lid remains slightly open and the coupling finger 19 pushes against the flap door 12 before the pail is applied against the frame, so that the pail's thrust is exerted on the door and tilts the frame before the latter is coupled to the pail. When the emptied pail is pulled away, the uncoupled frame remains lying in the bottom of the hopper and can only be raised with difficulty by hand.

These three inconveniences are eliminated in the new device described hereabove comprising a controlling rod formed of two sliding portions, which can be lengthened but not shortened.

Fig. 11 illustrates a first modification to the flap door's control device by means of an extensible rod of this kind, which achieves the same advantages. The flap door 12 and the lever 30 connected therewith are pivoted to a rod 31 having its lower pivoted end carried by a lever 32 adapted to swing about the fixed point 33 so as to enable the door to open freely when the frame is locked, and adapted to strike against a fixed support 34 in order to arrest the lowest point of rod 31 and act as in the device according to Fig. 10, during the tilting of the frame.

An alternate modification is illustrated in Figs. 12 and 13 in which the door 12 turns freely about the axis 35 in the direction of its free opening without tilting the frame, whilst when the frame is to be tilted, a rod 37 swinging about a lower fixed point lifts a lever 36 which rotates freely on axis 35 and carries with it by means of a clutch member 38, a clutch member 39 on the flap door which is consequently lifted. Fig. 12 is a cross-section of the hubs along line m—n of Fig. 13.

Another new device ensures the free opening of the door of the tilting frame while said frame remains locked in its inoperative position, whereas during tilting of the frame, the door's lowest point is obliged to follow a given path chosen so that said door can pass above the highest possible cone of refuse, while leaving the pail widely open, and yet moving away as little as possible from the entrance of the hopper, so that the whole of this "antidust" hopper structure remains as short as possible.

Fig. 14 illustrates merely by way of example an embodiment of a device having the above mentioned advantages. A lever 28 mounted on the axis of the flap door 12 has one end adapted to roll or slide on a fixed guideway 29 shaped so as to provide the above-mentioned advantages. The path D followed by the lowest point of the door thus may closely follow the outline of the discharge cone of the materials emptied from the pail and the top of said cone may be brought up to the opening of the overturned pail, i. e., be as high as possible.

The upper edge of the pail is strengthened by a ring of inverted U-section, which may conveniently be formed by suitably pressing an ordinary T iron to give same the shape shown at 14 in Fig. 3.

I claim:

1. In a device of the character described, a hopper, a frame pivotally mounted in said hopper and having a discharge opening therein, pail-engaging means carried by said frame for partially supporting a pail therein, a spring-actuated cam arranged in the path of and displaceable by the lid of the pail in the act of applying the latter to said frame, said cam being adapted to engage behind said pail to lock the later in position as the frame together with the pail are swung into discharging position, and means actuated upon the return movement of the frame and pail to disengage said cam from said pail and permit the removal of the latter.

2. A device as claimed in claim 1, characterized by the provision of means associated with the last-mentioned means to lock the frame in its initial position subsequent to the removal of the pail.

3. A device as claimed in claim 1, characterized by the provision of means associated with the last-mentioned means to lock the frame in its initial position subsequent to the removal of the pail, said cam acting upon the subsequent application of a pail to the frame to displace said locking means to inoperative position and permit the frame and pail to be swung to discharging position.

4. A device as claimed in claim 1, characterized by the provision of a locking device controlled by said cam for retaining the frame in initial position prior to the application of a pail to said frame.

5. A device as claimed in claim 1, characterized by the provision of a door normally closing said discharge opening, means coacting with said door to positively move the latter to open position as the frame approaches discharging position, and means coupling said door with the lid of said pail whereby the latter is opened simultaneously with said door.

6. A device as claimed in claim 1, characterized by means novelly supporting said frame in an over-balanced inclined position, the spring associated with said cam having such tension value as to assure the displacement of said cam prior to the displacement of the frame incident to tilting the latter to discharge position.

7. A device as claimed in claim 1, characterized by the provision of a hinged door normally closing said discharge opening and suspended for free swinging movement independently of said frame.

8. A device as claimed in claim 1, characterized by the provision of a hinged door normally closing said discharge opening and adapted to be coupled with the lid of said pail, linkage means acting to positively open said door with a swinging movement of the frame, said linkage including extensible members permitting manual opening of said door independently of said frame.

9. A means providing for the discharge of the contents of a pail, including a hopper, a frame swingable in the hopper, means in the frame for pivotally supporting the pail, a pail locking element mounted in the frame and displaceable in the movement of the pail on its pivotal supporting means to position the pail with respect to the frame, means for operating the locking element following its displacement by the pail to hold the pail in proper relation in the frame, and cooperating means on the hopper and frame for releasing the locking element with respect to the pail in the movement of the frame into normal position following pumping operation thereof, said cooperating means serving to hold the frame against swinging movement in a direction to dump the pail in the absence of a pail in said frame.

10. A means providing for the discharge of the contents of a pail, including a hopper, a pail receiving frame swingingly mounted in the hopper and movable from a normal position to a pail dumping position, means on the frame for pivotally supporting a pail, a shaft extending transverse the frame, a spring-pressed cam carried by the shaft, said cam being displaceable from a normal position by the movement of the pail in its pivotal position to arrange the pail in proper cooperation with the frame, the cam following its displacement by the pail moving under its spring tension to a position to lock the pail with respect to the frame, an arm carried by the shaft, and an abutment carried by the hopper, said arm and abutment cooperating to prevent movement of the frame with respect to the hopper while the cam remains in normal position, said cam being held by the pail when in locking cooperation with the pail in a position to hold the arm beyond the holding influence of the abutment, whereby the frame and pail are free to move in the hopper to a discharge position.

11. A construction as defined in claim 10, wherein the abutment on the hopper engages the arm on the shaft in the movement of the frame from dumping toward normal position to actuate the shaft and thereby the cam to release the cam holding effect on the pail.

12. A construction as defined in claim 10, wherein the arm and abutment cooperate in the movement of the frame from discharge to normal position to raise the cam to release the pail, the spring tension on the cam following the release of the pail serving to move the arm into locking cooperation with the abutment to prevent movement of the frame toward discharge position.

JOSEPH FEIDERT.